United States Patent
Lin et al.

(10) Patent No.: US 10,859,775 B1
(45) Date of Patent: Dec. 8, 2020

(54) OPTICAL TURNING MIRROR WITH ANGLED OUTPUT INTERFACE TO INCREASE COUPLING EFFICIENCY AND A MULTI-CHANNEL OPTICAL SUBASSEMBLY USING SAME

(71) Applicant: Applied Optoelectronics, Inc., Sugar Land, TX (US)

(72) Inventors: Kai-Sheng Lin, Sugar Land, TX (US); Ziliang Cai, Richmond, TX (US); Hao-Chiang Cheng, Houston, TX (US)

(73) Assignee: Applied Optoelectronics, Inc., Sugar Land, TX (US)

(*) Notice: Subject to any disclaimer, the term of this patent is extended or adjusted under 35 U.S.C. 154(b) by 0 days.

(21) Appl. No.: 16/561,555

(22) Filed: Sep. 5, 2019

(51) Int. Cl.
*G02B 6/42* (2006.01)

(52) U.S. Cl.
CPC .................. *G02B 6/4246* (2013.01)

(58) Field of Classification Search
CPC .................................................. G02B 6/4246
See application file for complete search history.

(56) References Cited

U.S. PATENT DOCUMENTS

| | | | | |
|---|---|---|---|---|
| 7,083,333 B2* | 8/2006 | Hodgson | ............... | G02B 6/4214 385/53 |
| 8,283,678 B2* | 10/2012 | Morioka | ............... | G02B 6/4214 257/82 |
| 8,483,571 B2* | 7/2013 | McColloch | .......... | G02B 6/4206 359/629 |
| 8,503,838 B2* | 8/2013 | Chen | .................... | H04B 10/564 385/31 |
| 8,913,858 B2* | 12/2014 | Charbonneau-Lefort | ................... | G02B 6/4214 385/33 |
| 9,323,013 B2* | 4/2016 | Shao | ..................... | G02B 6/4246 |
| 9,360,642 B2* | 6/2016 | Morioka | ............... | G02B 6/4214 |
| 9,817,196 B2* | 11/2017 | Ho | ........................ | G02B 6/4214 |
| 9,869,818 B2* | 1/2018 | Tang | ........................ | G02B 6/32 |

\* cited by examiner

*Primary Examiner* — Ryan A Lepisto
(74) *Attorney, Agent, or Firm* — Grossman Tucker Perreault & Pfleger, PLLC; Norman S. Kinsella (57) ABSTRACT

In general, the present disclosure is directed to an optical turning mirror for receiving channel wavelengths along a first optical path and reflecting the same towards a fiber or photodetector (PD) without the necessity of disposing a highly reflective layer to increase reflectivity. In more detail, the optical turning mirror includes a substantially transparent body, e.g., capable of passing at least 80% of incident wavelengths, that defines an input region with integrated focus lens(es) for receiving channel wavelengths along a first optical path and a reflective surface disposed opposite the input region to direct/launch received channel wavelengths along a second optical path towards an output interface having an angled light-transmissive surface, with the second optical path extending substantially transverse relative to the first optical path.

13 Claims, 8 Drawing Sheets

OPTICAL TURNING MIRROR WITH ANGLED OUTPUT INTERFACE TO INCREASE COUPLING EFFICIENCY AND A MULTI-CHANNEL OPTICAL SUBASSEMBLY USING SAME

TECHNICAL FIELD

The present disclosure relates to optical communications and more particularly, to an optical turning mirror for an on-board receiver optical subassembly (ROSA).

BACKGROUND INFORMATION

Optical transceivers are used to transmit and receive optical signals for various applications including, without limitation, Internet data center, cable TV broadband, and fiber to the home (FTTH) applications. Optical transceivers provide higher speeds and bandwidth over longer distances, for example, as compared to transmission over copper cables. The desire to provide higher transmit/receive speeds in increasingly space-constrained optical transceiver modules has presented challenges, for example, with respect to thermal management, insertion loss, RF driving signal quality and manufacturing yield.

Optical transceivers can include subassembly modules for transmitting and receiving data known generally as transmitter optical subassemblies (TOSAs) and receiver optical subassemblies (ROSAs). Such subassemblies can be implemented on substrates, such as printed circuit boards, and can include optical components such as turning mirrors to redirect received light on to photosensitive regions of a photodiode, for example. However, turning mirrors can introduce loss and can cause diffusion/distortion such that optical coupling efficiency is decreased when redirecting light towards a photodetector or optical fiber. Optical turning mirrors raise numerous non-trivial challenges and the continued use of such devices depends at least in part on approaches the minimize or otherwise reduce associated losses.

BRIEF DESCRIPTION OF THE DRAWINGS

These and other features and advantages will be better understood by reading the following detailed description, taken together with the drawings wherein.

DETAILED DESCRIPTION

Figure 7:
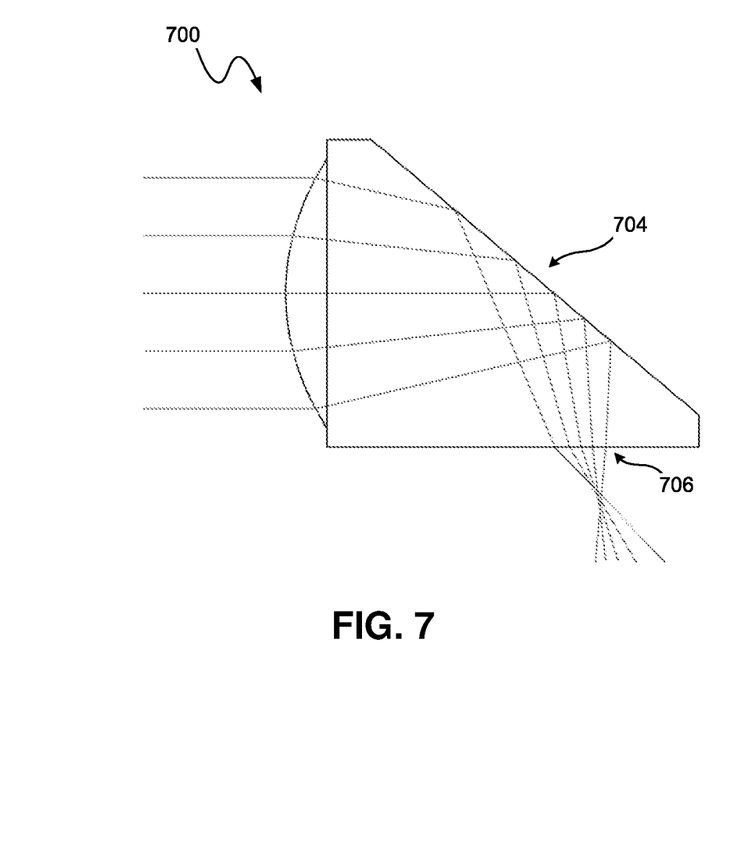
FIG. 7 shows an example optical turning mirror for use in multi-channel optical subassemblies.

Optical turning mirrors generally include a body that turns/redirects incident wavelengths towards an associated fiber or photodiode PD. For instance, FIG. 7 shows one example of an optical turning mirror 700 with integrated focus lens that is configured to receive channel wavelengths and turn the same based on an interface between angled surface 704 and the surrounding media, e.g., air. As shown, the angled surface 704 (which may also be referred to as a reflective surface) includes an angle of about 45 degrees to reflect incident light towards the output interface 706, e.g., based on Snell's Law. However, without a coating to increase reflectivity (e.g., such as a layer of metallization), a percentage of light fails to reflect towards the output interface 706 and exits the body resulting in loss. Reflective coatings, although well suited for reducing such loss, significantly increase cost and manufacturing complexity. The angle of the reflective surface 704 can be adjusted to increase reflectivity, however, the resulting reflection can decrease focus as the light beam reflects at the output interface 706. This can ultimately introduce power losses, so approaches to turning mirrors tend to utilize 45 degree reflective surfaces with reflective coatings despite the significant per-channel costs associated therewith.

In general, the present disclosure is directed to an optical turning mirror for receiving channel wavelengths along a first optical path and reflecting the same towards a fiber or photodetector (PD) without the necessity of disposing a highly reflective layer to increase reflectivity. In more detail, the optical turning mirror includes a substantially transparent body, e.g., capable of passing at least 80% of incident wavelengths, that defines an input region with integrated focus lens(es) for receiving channel wavelengths along a first optical path and a reflective surface disposed opposite the input region to direct/launch received channel wavelengths along a second optical path towards an output interface, with the second optical path extending substantially transverse relative to the first optical path. The reflective surface includes an angle relative to the first light path that measures less than 45 degrees, e.g., 35-44 degrees, to cause incident channel wavelengths to "turn" and to launch the incident channel wavelengths towards the PD/fiber. The body further provides output interface formed from an angled light-transmissive surface to compensate for the angle of the reflective surface. In an embodiment, the angle of the reflective surface is 35 degrees relative to the first light path, and the angle of the light-transmissive surface is 10 degrees relative to the first light path. Accordingly, light incident the light-transmissive surface reflects such that the beam substantially converges at a single point, e.g., the principle focus.

Thus, the angled light-transmissive surface reflect/shifts the second optical path such that a principle focus of a beam carrying the incident channel wavelengths (e.g., the point at which light rays converge along the second optical path) can be disposed in close proximity to, or intersect with, a light-sensitive region of an associated PD to increase optical coupling efficiency relative to turning mirror approaches that utilize a flat or non-angled output interface.

In an embodiment, the body of the optical turning mirror can be elongated to provide a plurality of input ports (and corresponding input focus lenses) and a reflective surface that extends along the longitudinal axis of the body to provide a common reflective surface for each input port. Likewise, the body can further include an angled light-transmissive surface that extends along the longitudinal axis to provide a common output interface for the input ports to provide compensation and ensure nominal optical coupling with the PD/fiber, as discussed above. The body of the optical turning mirror can further include an accommodation groove that is defined at least in part by the light-transmissive surface when the optical turning mirror is coupled to a substrate. The accommodation groove can be configured to at least partially receive an array of PDs (e.g., a PD bar) and allow for the array of PDs to have corresponding detection regions optically aligned with associated input ports.

As used herein, "on-board" in the context of a ROSA arrangement includes direct or indirect coupling of ROSA components to a common substrate. The components of the ROSA arrangement may be coupled to the same surface, or different surfaces of the same substrate. Likewise, the TOSA components may be coupled to the same or different surfaces of the substrate. In some cases, the substrate may include multiple pieces/segments, and this disclosure is not intended to be limited to a single substrate.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. This disclosure is equally applicable to coarse wavelength division multiplexing (CWDM). In one specific example embodiment, the channel wavelengths are implemented in accordance with local area network (LAN) wavelength division multiplexing (WDM), which may also be referred to as LWDM. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals.

The term substantially, as generally referred to herein, refers to a degree of precision within acceptable tolerance that accounts for and reflects minor real-world variation due to material composition, material defects, and/or limitations/peculiarities in manufacturing processes. Such variation may therefore be said to achieve largely, but not necessarily wholly, the stated characteristic. To provide one non-limiting numerical example to quantify "substantially," minor variation may cause a deviation of up to and including ±5% from a particular stated quality/characteristic unless otherwise provided by the present disclosure.

Figure 1:
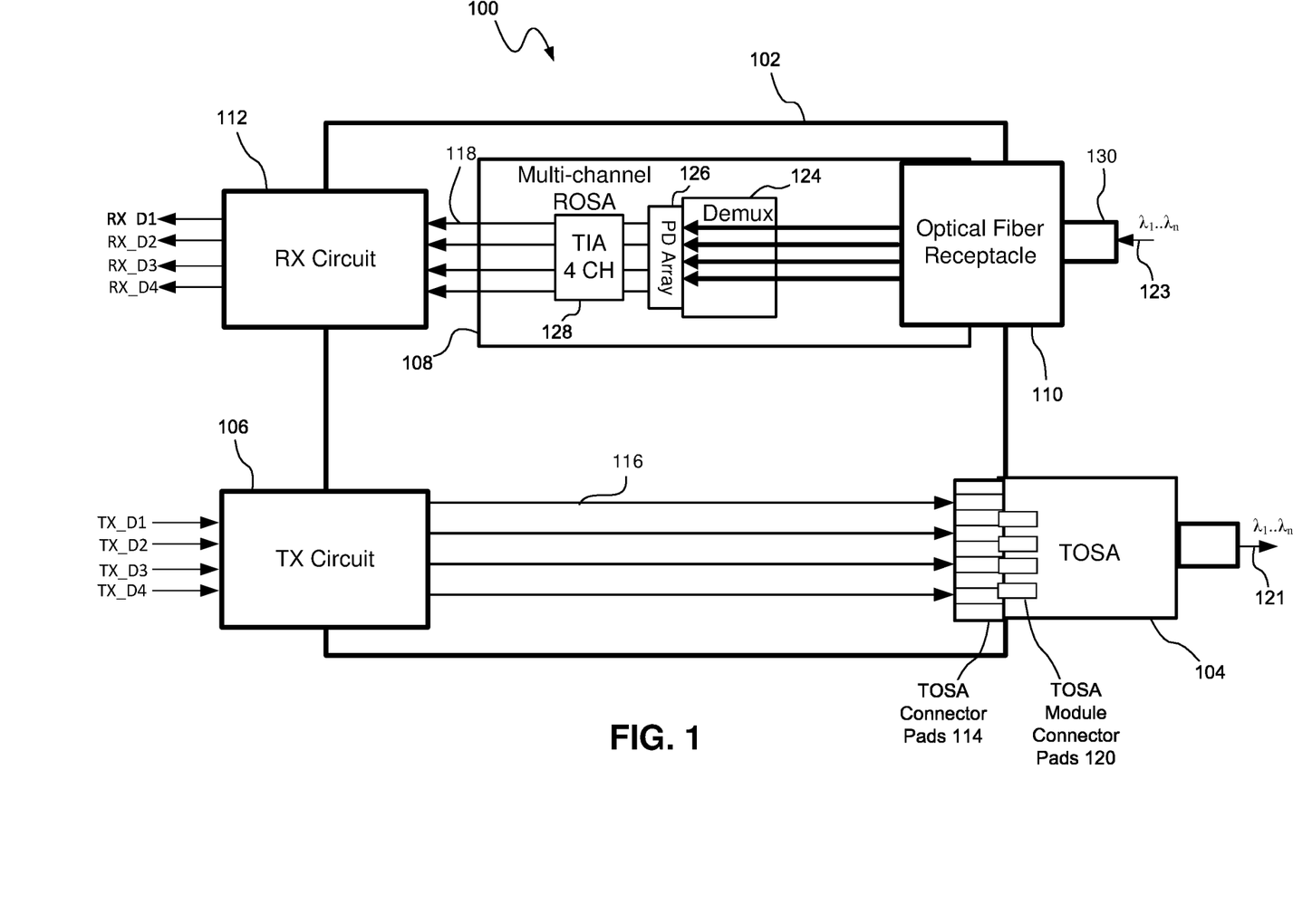
FIG. 1 is a block diagram of a multi-channel optical transceiver, consistent with embodiments of the present disclosure.

Referring to the Figures, FIG. 1 illustrates an optical transceiver 100, consistent with embodiments of the present disclosure. The optical transceiver 100 is shown in a highly simplified form for clarity and ease of explanation. In this embodiment, the optical transceiver 100 transmits and receives four (4) channels using four different channel wavelengths ($\lambda 1$, $\lambda 2$, $\lambda 3$, $\lambda 4$) and may be capable of transmission rates of at least about 25 Gbps per channel. In one example, the channel wavelengths $\lambda 1$, $\lambda 2$, $\lambda 3$, $\lambda 4$ may be 1270 nm, 1290 nm, 1310 nm, and 1330 nm, respectively. Other channel wavelengths are within the scope of this disclosure including those associated with local area network (LAN) wavelength division multiplexing (WDM). The optical transceiver 100 may also be capable of transmission distances of 2 km to at least about 10 km. The optical transceiver 100 may be used, for example, in internet data center applications or fiber to the home (FTTH) applications.

The optical transceiver 100 may include a number of components to support transceiver operations. The optical transceiver 100 may include an optical transceiver substrate 102, a transmitter optical subassemblies (TOSA) module 104 for transmitting optical signals on different channel wavelengths, transmit connecting circuit 106, a multi-channel receiver optical subassembly (ROSA) 108 for receiving optical signals on different channel wavelengths, an optical fiber receptacle 110 to receive and align a fiber connector (e.g., a ferrule) with the ROSA, and a receiver connecting circuit 112.

The optical transceiver substrate 102 includes traces, connector pads, and other circuitry to support transceiver operations. The optical transceiver substrate 102 may include TOSA connector pads 114 (or terminals 114) that enable the TOSA module 104 to mount and electrically couple to the optical transceiver substrate 102. The optical transceiver substrate 102 may include traces 116 that couple the TOSA connector pads 114 to the transmit connecting circuit 106. The optical transceiver substrate 102 may include traces 118 that electrically couple the ROSA 108 to the receiver connecting circuit 112. The optical transceiver substrate 102 may be manufactured from a multi-layer printed circuitry board (PCB), although other types of substrates may be utilized and are within the scope of this disclosure.

The TOSA module 104 may be configured to receive driving electrical signals (TX_D1 to TX_D4), convert the electrical signals to a multiplexed optical signal (e.g., a signal with channel wavelengths $\lambda 1 \ldots \lambda_n$) and launch the same via a transmit optical fiber 121. The TOSA module 104 may be electrically coupled to the TOSA connector pads 114 and to the traces 116 through TOSA module connector pads 120. The TOSA module 104 may further include a receptacle for optically coupling to the transmit optical fiber 121. The TOSA module 104 may include a housing that defines a cavity, with the cavity having filters, mirrors and other active/passive optical components for combining channel wavelengths to output a multiplexed optical signal.

The multi-channel ROSA 108 includes an optical demultiplexer 124, a photodetector array 126 (e.g., photodiodes), and a trans-impedance amplifier (TIA) 128 for converting optical signals into electrical signals. The optical demultiplexer 124 receives the optical signal from the receive optical fiber 123. The optical demultiplexer 124 is optically coupled to the photodetector array 126 by way of an optical turning mirror, as discussed in greater detail below. The photodetector array 126 is electrically coupled to the trans-impedance amplifier 128 to provide electrical signals (RX_D1 to RX_D4) to the receiver connecting circuit 112. Other embodiments of a ROSA may also be used in the optical transceiver 100 for receiving and detecting one or more different optical signals.

The receiver connecting circuit 112 is electrically connected to the electronic components (e.g., the laser, monitor photodiode, etc.) in the ROSA 108. The receiver connecting circuit 112 can include conductive paths to provide electrical connections and may also include additional circuitry.

The optical fiber receptacle 110 couples and aligns the ROSA arrangement 108 with an optical fiber within the optical fiber ferrule 130, according to an embodiment. The optical fiber receptacle 110 may be securely attached to the optical transceiver substrate 102 via welding, soldering, and/or an adhesive. The optical fiber receptacle 110 may also include a slot/groove that is formed to receive at least part of the optical transceiver substrate 102. The slot of the optical fiber receptacle 110 may be configured to make contact with a first (top) surface and a bottom (second) surface of the optical transceiver substrate 102 for mounting purposes. The optical fiber receptacle 110 may at least partially be manufactured from metal to facilitate welding or soldering to the optical transceiver substrate 102.

Figure 2:
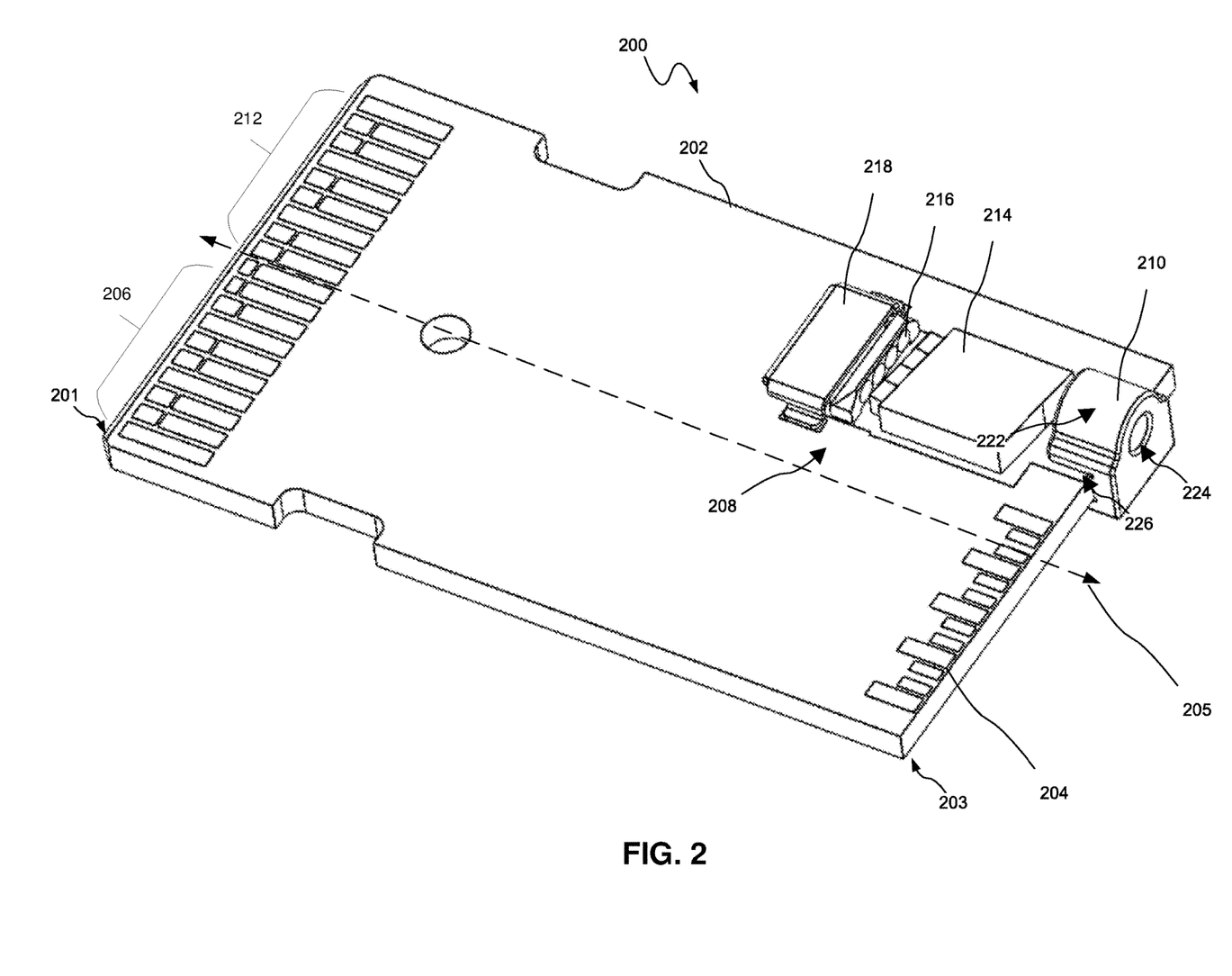
FIG. 2 is a perspective view of a multi-channel optical transceiver having an on-board receiver optical subassembly (ROSA) arrangement, consistent with embodiments of the present disclosure.

FIG. 2 illustrates a perspective view of an optical transceiver 200, consistent with embodiments of the present disclosure. The optical transceiver 200 is an example of an implementation of the optical transceiver 100, according to an embodiment. The optical transceiver 200 generally includes an optical transceiver substrate 202, TOSA connector pads 204 for electrically coupling to a TOSA module, connector pads 206, an on-board ROSA arrangement 208 for receiving an optical signal having different channel wavelengths, an optical fiber receptacle 210 to receive and align an optical fiber ferrule with the ROSA arrangement 208, and receiver connector pads 212 (or terminals). The on-board ROSA arrangement may also be referred to herein as simply a ROSA arrangement. The optical transceiver substrate, or simply the substrate, includes a first end 201 that extends to a second end 203 along a longitudinal axis 205. The first end 201 includes a region for electrically coupling to transmit and/or receiver circuitry and the second end 203 includes a region for optically coupling with the TOSA and on-board ROSA arrangement. Thus, the first end 201 may be accurately referred to as an electrical coupling end and the second end 203 may be accurately referred to as an optical coupling end.

The multi-channel ROSA arrangement 208 includes an optical demultiplexer 214, an optical turning mirror 216 (which may be referred to herein as simply a turning mirror), an array of photodiodes (not shown) and a multi-channel trans-impedance amplifier (TIA) 218 for converting optical signals into electrical signals. The optical demultiplexer 214 receives the optical signals from an optical fiber, e.g., the receive optical fiber 123, and separates channel wavelengths from an optical signal. The separated channel wavelengths may then be provided to the array of photodiodes by way of the turning mirror 216, as discussed in greater detail below. The TIA 218 may then be used in combination with the array of photodiodes to convert the detected channel wavelengths into electrical signals during receive operations. The electrical signals may then be provided to associated circuitry via the pads/terminals 212.

As previously discussed, the optical fiber receptacle 210 includes structure that enables the same to receive and align an optical fiber with the ROSA arrangement 208. The optical fiber receptacle 210 includes a body 222, an aperture 224 formed through the body 222, and a slot 226 formed in the body 222 to couple the optical fiber receptacle 210 to the optical transceiver substrate 202. The body 222 formed from a single or multiple pieces of plastic, metal, or other suitably ridged material.

Figure 3:
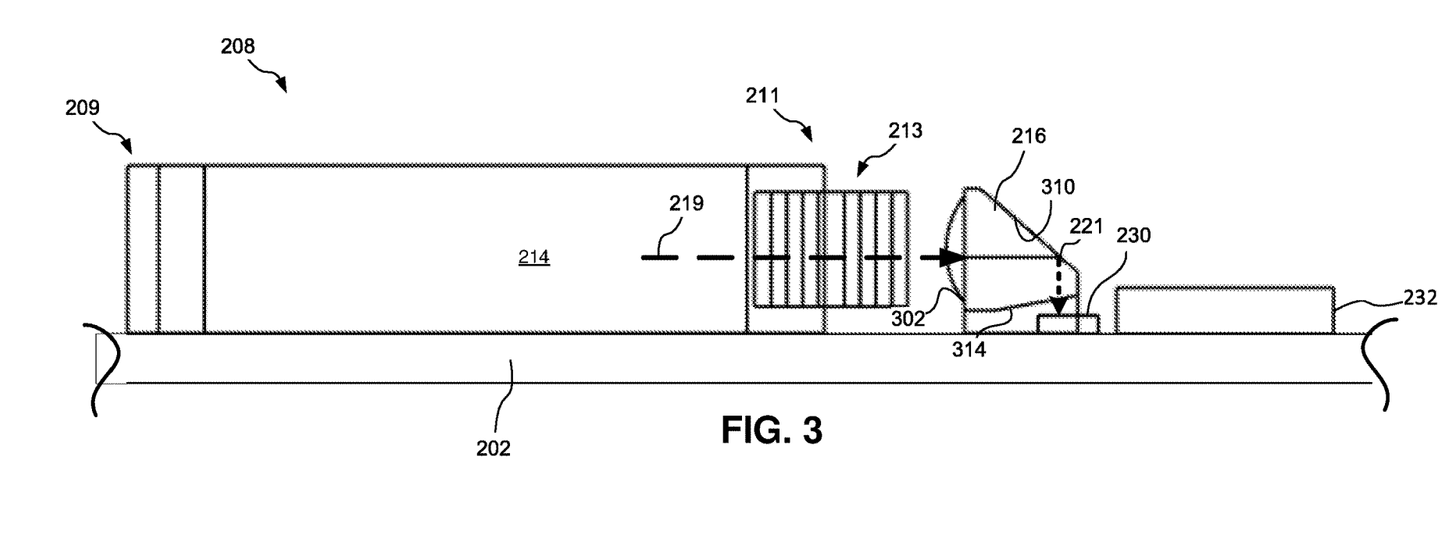
FIG. 3 shows a side view of the ROSA arrangement of FIG. 2 in accordance with an embodiment of the present disclosure.

FIG. 3 shows a side view of the multi-channel ROSA arrangement 208 in isolation in accordance with an embodiment. As shown, the multi-channel ROSA arrangement includes an optical demultiplexer 214, optical isolator 213, optical turning mirror 216, photodetectors 230, and transimpedance amplifier (TIA) 232.

The optical demultiplexer 214 comprises, for instance, an arrayed waveguide grating (AWG) or other suitable device, e.g., an optical splitter. The optical demultiplexer 214 includes a first end 209 for receiving a multiplexed optical signal, e.g., a wavelength division multiplexed (WDM) signal. The optical demultiplexer 214 separates/splits each channel wavelength within the multiplexed optical signal. The optical demultiplexer 214 includes a second end 211 or output end 211 for outputting the separated channel wavelengths along a plurality of optical paths, as discussed in greater detail below. The optical demultiplexer 214 can include an optional integrated optical isolator 213, as shown, to reduce noise and maximize power.

Continuing on, the optical demultiplexer 214 is optically aligned with optical turning mirror 216. Optical turning mirror 216 includes a body 302 (See FIG. 4) formed of a substantially transparent material, e.g., passes 80% of incident channel wavelengths and preferably 90-100% of incident channel wavelengths. The body 302 is formed from a single monolithic piece of material, although other embodiments are within the scope of this disclosure. The body 302 configured to receive incident channel wavelengths along a first light path (or optical path) generally indicated at 219 and direct/reflect the same along a second light path 221, with the first and second light paths 219, 221 being substantially transverse relative to each other, as discussed in greater detail below. The photodiodes 230 include light-sensitive (also known as photosensitive) regions aligned with the second light path 221 to receive and convert the incident channel wavelengths into proportional electrical signals. The transimpedance amplifier receives the electrical signals output by the photodiodes 230 and can amplify and filter the same to ultimately provide receive signals RX_D1 to RX_D4 via the receiver connecting circuit 112.

Figure 4:
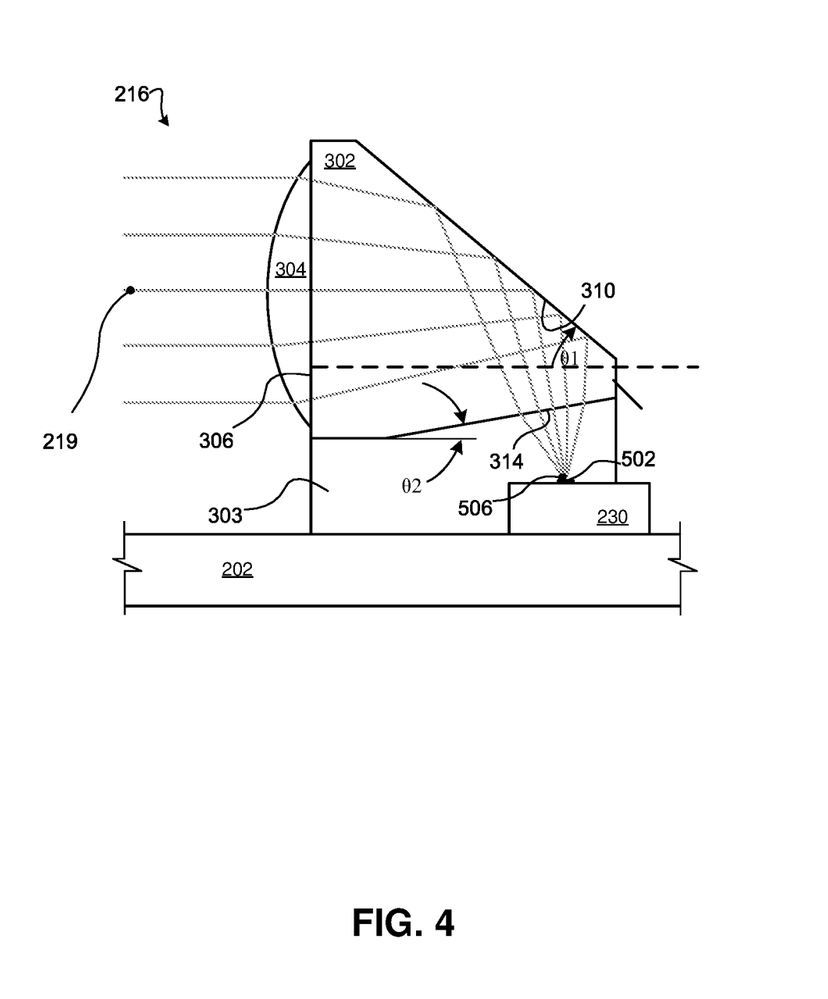
FIG. 4 shows a side view of an optical turning mirror suitable for use in the ROSA arrangement of FIG. 2, in accordance with an embodiment.

FIG. 4 shows a side view of the optical turning mirror 216 in accordance with an embodiment of the present disclosure. As shown, the optical turning mirror includes a body 302. The body 302 defines an input region 306, reflective surface 310, and output interface 314 (or output region). The input region 306 can optionally include a plurality of focus lenses 304, with each of the focuses lenses aligned with output ports of the optical demultiplexer 214 (See FIG. 3) to receive separated channel wavelengths along the first light path 219. The body 302 further defines a base 303 with at least one substantially flat mating surface to mount to the substrate 202.

Continuing on, the body 302 of the optical turning mirror 216 is defined at least in part by a reflective surface 310 disposed opposite the input region 306, with reflective surface 310 being angled at a first angle $\theta 1$ relative to the first optical path 219. The first angle $\theta 1$ is chosen based on Snell's law such that the interface between the reflective surface 310 and the surrounding media (e.g., air) causes incident wavelengths received along optical path 219 to reflect, and preferably to introduce total internal reflection. Some non-limiting examples for the media/material of the body 302 includes glass, silica, plastic or any other suitable material that is substantially transparent and achieves the desired reflectivity/reflection.

Figure 5A:
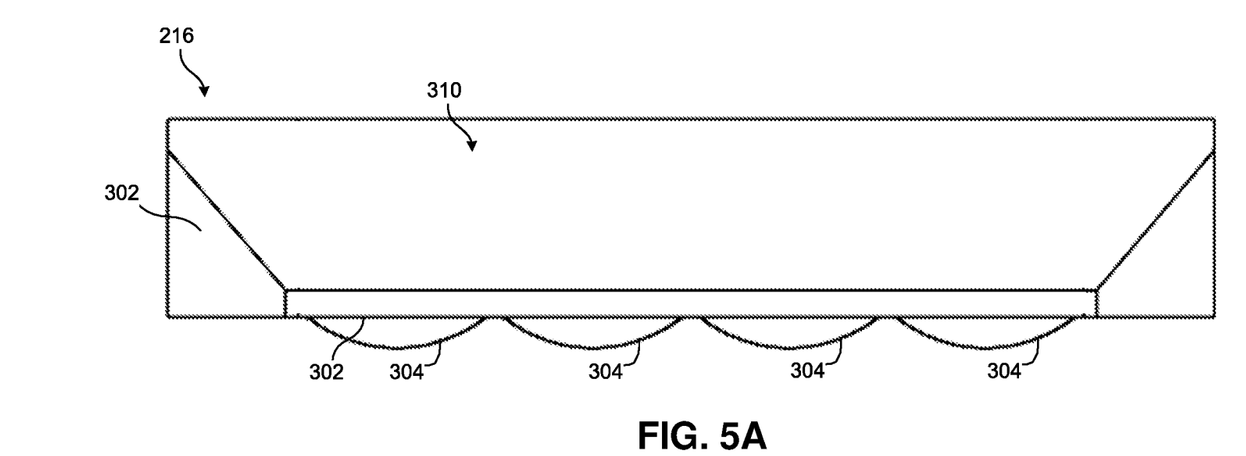
FIG. 5A shows a top view of the optical turning mirror of FIG. 4 in accordance with an embodiment.
Figure 5B:
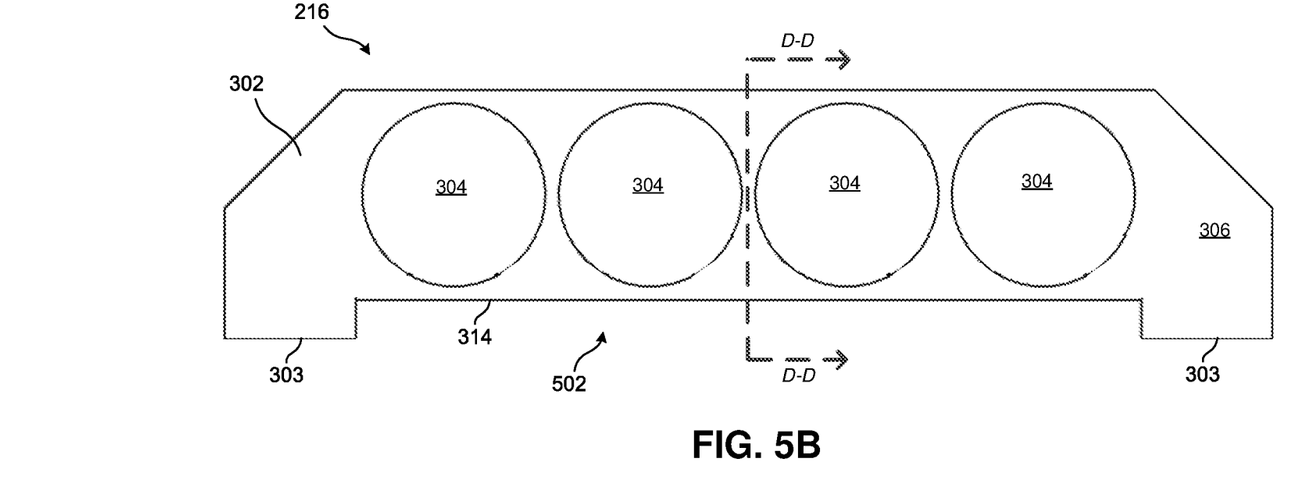
FIG. 5B shows a front view of the optical turning mirror of FIG. 4 in accordance with an embodiment.
Figure 5C:
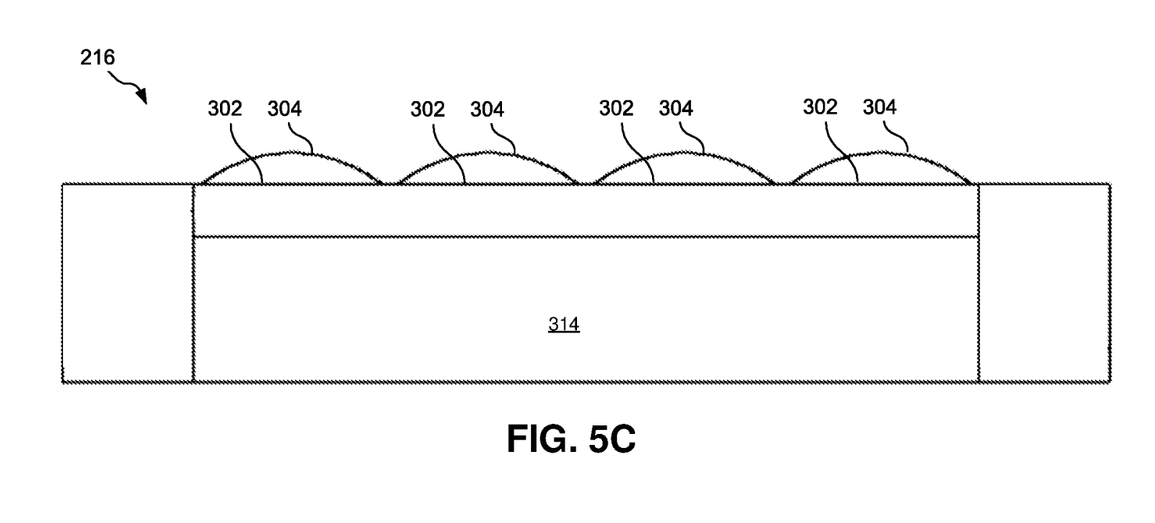
FIG. 5C shows a bottom view of the optical turning mirror of FIG. 4 in accordance with an embodiment.
Figure 5D:
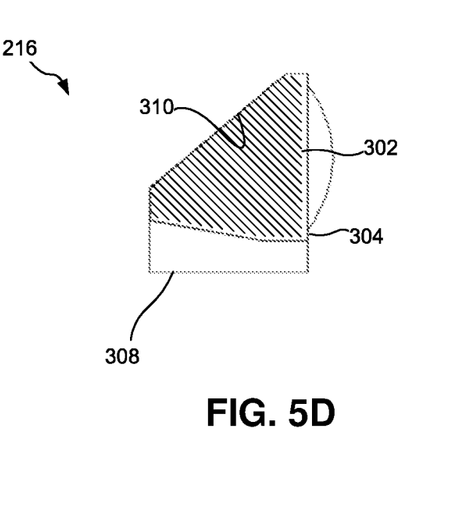
FIG. 5D shows a cross-sectional view of the optical turning mirror of FIG. 5B taken along line D-D, in accordance with an embodiment.

Consider one specific example embodiment where the body 302 comprises glass and the media surrounding the body 302 comprises air. In this example embodiment, the reflective surface 310 includes a first angle $\theta 1$ of 35±4 degrees to cause incident light to reflect and launch along the second light path 221, with the second light path 219 being substantially transverse relative to the first light path 219. In this context, the first angle θ1 being less than 45° increases reflectivity at the interface between the reflective surface 310 and surrounding media, but also causes the second light path 221 to extend at a non-zero angle relative to normal and further tends to de-focus the incident light beam. This disclosure has identified that an output interface formed with an angled surface can compensate for the aforementioned issues and can be utilized to focus the incident light beam beyond approaches to turning mirrors that utilize a traditional 45-degree reflective surface and 0-degree output interface surface. In more detail, and as shown in FIG. 4, the second light path 221 intersects with the surface defining the output interface 314, with output interface 314 being formed at least in part by a light-transmissive surface 308 (See FIG. 5D). The light-transmissive surface 308 includes a second angle θ2 relative to the first optical path 219 (or first light path 219), with the second angle θ2 being selected based on the following equation:

$$\theta_2 = 2*(45° - \theta_1) \quad \text{Equation 1}$$

Thus, the second angle θ2 of the light-transmissive surface 308 of the output interface 314 can be selected to introduce reflection to compensate for the first angle θ1 of the reflective surface 310 such that the second light path 221 is shifted/displaced by the offset/delta between 45 degrees and the first angle θ1. Accordingly, the second light path 221 has a principle focus 506 that intersects at substantially the photosensitive region of photodiodes 230. A calculated focal length and resulting principle focus can be utilized to select the height of the photodiode 230 to ensure nominal optical coupling. Alternatively, or in addition, the base 303 can be dimensioned to ensure that the principle focus 506 is substantially aligned with and immediately adjacent/on a corresponding photosensitive region of the photodiodes 230 to ensure nominal optical coupling.

FIGS. 5A-5D collectively show the optical turning mirror 216 in accordance with an embodiment. As shown, the input region 306 defines a plurality of focuses lenses 304 arrayed with substantially equal distance therebetween. Thus, each of the focus lenses 304 can be disposed at a uniform distance relative to each other to ensure alignment with output ports of the demultiplexer 214. Accordingly, the first optical path 219 can include a plurality of parallel light paths that collectively form the first light path 219 by which separated channel wavelengths are launched from the demultiplexer 214 and received by the optical turning mirror 216.

As further shown, the body 302 of the optical turning mirror 216 includes an accommodation groove 502. The accommodation groove 502 is defined at least in part by the surface defining the output interface 314 and surfaces of the base 303. The surface defining the output interface 314 faces the surface of the substrate 202 that couples to and supports the optical turning mirror 216. The accommodation groove 502 thus provides a slot/opening when the optical turning mirror 216 couples to the substrate 202 for at least partially receiving photodiodes 230.

Figure 6:
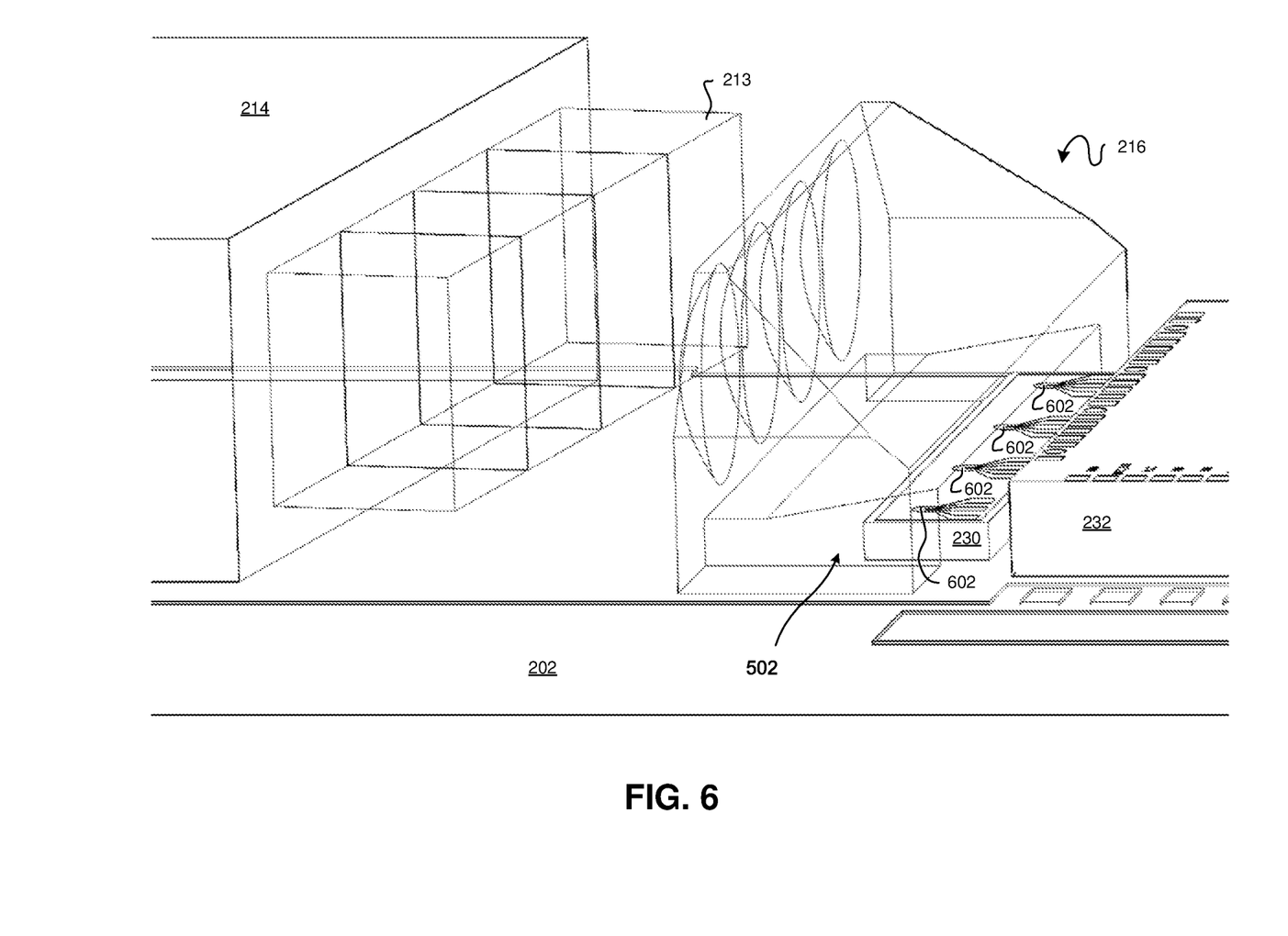
FIG. 6 shows a perspective view of the ROSA arrangement of FIG. 2 in accordance with an embodiment.

As shown in FIG. 6, the accommodation groove 502 extends in parallel with the longitudinal axis of the optical turning mirror 216. The photodiodes 230 include a submount and a plurality of PDs disposed thereon. Each of the PDs include a photosensitive region 602 aligned with the output interface of the optical turning mirror 216 to receive optical signals from outputs of the demultiplexer 214.

In accordance with an aspect of the present disclosure an optical turning mirror for use in an optical subassembly is disclosed. The optical turning mirror comprising a body formed of a substantially transparent material, the body defining at least one mating surface for coupling to a mounting surface of a supporting substrate, an input region defined by a surface at a first end of the body for receiving and passing incident channel wavelengths into the body along a first optical path, a reflective surface defined by the body, the reflective surface extending at a first predetermined angle relative to the first optical path to reflect the received channel wavelengths received along the first optical path along a second optical path, the first and second optical paths being substantially transverse relative to each other, an output region defined by a light-transmissive surface of the body, the output region to pass the received channel wavelengths received along the second optical path from the body towards an associated optical component; and wherein the light-transmissive surface of the body extends at a second predetermined angle relative to the first optical path to introduce a compensating angle of reflection.

In accordance with another aspect of the present disclosure an optical subassembly is disclosed. The optical subassembly comprising a substrate with a mounting surface for coupling to and supporting at least one optical component, a demultiplexer coupled to the substrate, the demultiplexer having an input to receive an optical signal having a plurality of channel wavelengths and an output to launch a plurality of optical signals in parallel with each other along a first light path, a multi-channel optical turning mirror coupled to the substrate, the multi-channel optical turning mirror comprising a substantially transparent body with an input region aligned with the output of the demultiplexer to receive the plurality of optical signals and a reflective surface to output the plurality of optical signals along a second light path, the second light path being substantially transverse relative to the first light path, wherein the multi-channel optical turning mirror includes an angled light-transmissive surface disposed along the second light path to provide an output interface, the angled light-transmissive surface extending at a predetermined angle relative to the first light path to reflect channel wavelengths received along the second light path.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An optical turning mirror for use in an optical subassembly, the optical turning mirror comprising:
   a body formed of a substantially transparent material, the body defining at least one mating surface for coupling to a mounting surface of a supporting substrate;
   an input region defined by a surface at a first end of the body for receiving and passing incident channel wavelengths into the body along a first optical path;
   a reflective surface defined by the body, the reflective surface extending at a first predetermined angle relative to the first optical path to reflect the received channel wavelengths received along the first optical path along a second optical path, the first and second optical paths being substantially transverse relative to each other;
   an output region defined by a light-transmissive surface of the body, the output region to pass the received channel wavelengths received along the second optical path from the body towards an optical component;

wherein the light-transmissive surface of the body extends at a second predetermined angle relative to the first optical path to introduce a compensating angle of reflection; and and wherein the body further defines an accommodation groove, the accommodation groove being at least partially defined by the light-transmissive surface and configured to at least partially receive the optical component when coupled to a substrate.

2. The optical turning mirror of claim 1, wherein the first predetermined angle is substantially thirty-five (35) degrees and the second predetermined angle is between five (5) and fifteen (15) degrees.

3. The optical turning mirror of claim 1, wherein the second predetermined angle is ten (10) degrees.

4. The optical turning mirror of claim 1, wherein the optical component comprises at least one photodiode, and wherein the accommodation groove is configured to at least partially receive the at least one photodiode when coupled to the supporting substrate.

5. The optical turning mirror of claim 1, wherein the at least one mating surface is substantially flat.

6. The optical turning mirror of claim 1, wherein the body further comprises a focus lens disposed at the input region.

7. The optical turning mirror of claim 1, wherein the input region is configured to align with output ports of a demultiplexer device to receive separated receive channel wavelengths, and wherein the reflective surface is a common reflective surface whereby light emitted by each output port gets reflected towards an associated photodiode or optical fiber.

8. The optical turning mirror of claim 1 implemented in a multi-channel optical transceiver capable of sending and receiving at least four different channel wavelengths.

9. An optical subassembly, the optical subassembly comprising:

a substrate with a mounting surface for coupling to and supporting at least one optical component;

a demultiplexer coupled to the substrate, the demultiplexer having an input to receive an optical signal having a plurality of channel wavelengths and an output to launch a plurality of optical signals in parallel with each other along a first light path;

a multi-channel optical turning mirror coupled to the substrate, the multi-channel optical turning mirror comprising a substantially transparent body with an input region aligned with the output of the demultiplexer to receive the plurality of optical signals and a reflective surface to output the plurality of optical signals along a second light path, the second light path being substantially transverse relative to the first light path;

wherein the multi-channel optical turning mirror includes an angled light-transmissive surface disposed along the second light path to provide an output interface, the angled light-transmissive surface extending at a predetermined angle relative to the first light path to reflect channel wavelengths received along the second light path.

10. The optical subassembly of claim 9, wherein the predetermined angle of the light-transmissive surface is between five (5) and fifteen (15) degrees.

11. The optical subassembly of claim 9, wherein the predetermined angle of the light-transmissive surface is substantially equal to forty-five (45) degrees minus the angle of the reflective surface relative to the first light path.

12. The optical subassembly of claim 9, wherein the multi-channel optical turning mirror defines an accommodation groove being defined at least in part by the light-transmissive surface and the substrate, the accommodation groove to at least partially receive a photodiode array.

13. The optical subassembly of claim 9, wherein the multi-channel optical turning mirror extends along a longitudinal axis of the multi-channel optical turning mirror.

* * * * *